United States Patent
Yen (10) Patent No.: US 9,465,428 B2
(45) Date of Patent: Oct. 11, 2016

(54) COMPUTER DEVICE

(71) Applicant: Quanta Computer Inc., Taoyuan Shien (TW)

(72) Inventor: Wei-Ting Yen, Taipei (TW)

(73) Assignee: QUANTA COMPUTER INC., Taoyuan (TW)

( * ) Notice: Subject to any disclaimer, the term of this patent is extended or adjusted under 35 U.S.C. 154(b) by 282 days.

(21) Appl. No.: 14/199,415

(22) Filed: Mar. 6, 2014

(65) Prior Publication Data
US 2015/0149807 A1    May 28, 2015

(30) Foreign Application Priority Data
Nov. 26, 2013  (TW) .............................. 102143060 A (51) Int. Cl.
G06F 1/32 (2006.01)
(52) U.S. Cl.
CPC .................................. G06F 1/3212 (2013.01)
(58) Field of Classification Search
CPC ... G06F 1/3212; H02J 7/0008; H02J 7/0021; H02J 2007/005; H02J 2007/0067; H02J 2007/0096; H02J 2007/0098
See application file for complete search history.

(56) References Cited

U.S. PATENT DOCUMENTS

| 6,856,922 B1* | 2/2005 | Austin ................ | H02J 7/0073 320/132 |
| 2002/0113575 A1* | 8/2002 | Lee ...................... | H02J 7/0047 320/132 |
| 2005/0085277 A1* | 4/2005 | Chen ..................... | G06F 1/3215 455/572 |
| 2007/0123316 A1* | 5/2007 | Little ..................... | G06F 21/31 455/573 |
| 2008/0307134 A1* | 12/2008 | Geissler .............. | G06F 13/4291 710/110 |
| 2010/0315249 A1* | 12/2010 | Imai ...................... | G06F 1/263 340/636.12 |
| 2014/0068310 A1* | 3/2014 | Sultenfuss ............. | G06F 1/28 713/340 |

FOREIGN PATENT DOCUMENTS

| TW | 200641591 A | 12/2006 |
| TW | 201039129 A | 11/2010 |
| TW | 201131348 A | 9/2011 |

* cited by examiner

Primary Examiner — Dennis M Butler
(74) Attorney, Agent, or Firm — Rabin & Berdo, P.C.

(57) ABSTRACT

A computer device is disclosed. The computer device includes a central processing unit (CPU), a chipset, an input/output (I/O) chip, a general purpose I/O (GPIO) interface, and a smart battery. The chipset is electrically connected to the CPU. The I/O chip is electrically connected to the chipset. The GPIO interface is electrically connected to the CPU. The smart battery is electrically connected to the GPIO interface and the I/O chip. The CPU reads information of two bytes saved in the smart battery through the GPIO interface and determines a relative processing according to information of two bytes when a status of the smart battery is changed.

9 Claims, 4 Drawing Sheets

COMPUTER DEVICE

RELATED APPLICATIONS

This application claims priority to Taiwan Application Serial Number 102143060, filed Nov. 26, 2013, which is herein incorporated by reference.

BACKGROUND

1. Field of Invention

The present invention relates to a computer device. More particularly, the present invention relates to a computer device configured to monitor a smart battery.

2. Description of Related Art

So far as a computer device at present is concerned, when the computer device like a notebook is in a battery mode, a system terminal of the computer device performs monitoring and warning in advance for an operative temperature and an over-current of the battery, and then notifies a CPU to make the CPU perform a frequency down-conversion to protect the computer device. This is the only way and the only path that the CPU may possibly know a status of the battery. Once the path of forewarning is delayed or the system terminal has an error determination, the CPU may have a wrong action to make the computer device malfunction.

SUMMARY

A computer device is provided to resolve the problems met in the art.

According to an embodiment of the present invention, the computer device includes a central processing unit (CPU), a chipset, an input/output (I/O) chip, a general purpose I/O (GPIO) interface, and a smart battery. The chipset is electrically connected to the CPU. The I/O chip is electrically connected to the chipset. The GPIO interface is electrically connected to the CPU. The smart battery is electrically connected to the GPIO interface and the I/O chip. The CPU reads information of two bytes stored in the smart battery through the GPIO interface and determines a relative processing according to information of two bytes when a status of the smart battery is changed.

In an embodiment, the information of the two bytes includes a first byte and a second byte. The first byte records a proportion of current capacity to full charge capacity and a proportion of the full charge capacity to rated capacity of the smart battery. The second byte records a status of an operating temperature and a status of an over-current of the smart battery.

In an embodiment, the first byte includes two full charge capacity bits configured to record the proportion of the full charge capacity to the rated capacity of the smart battery. When the CPU reads the full charge capacity bits and the full charge capacity of the smart battery is lower than a warning proportion of the rated capacity, the CPU sends a warning instruction through the chipset and the I/O chip sequentially and determines a frequency down-conversion range according to the proportion of the full charge capacity to the rated capacity of the smart battery.

In an embodiment, the first byte further includes a current capacity bit configured to record the proportion of the current capacity to the full charge capacity of the smart battery. The CPU sends the warning instruction through the chipset and the I/O chip sequentially when the CPU reads the current capacity bit and the current capacity of the smart battery is a first proportion of the full charge capacity. The CPU sends the warning instruction and a compensation instruction through the chipset and the I/O chip sequentially when the CPU reads the current capacity bit and the current capacity of the smart battery is a second proportion of the full charge capacity, wherein the second proportion is less than the first proportion. The CPU sends the warning instruction and a sleeping instruction through the chipset and the I/O chip sequentially when the CPU reads the current capacity bit and the current capacity of the smart battery is a third proportion of the full charge capacity, wherein the third proportion is less than the second proportion.

In an embodiment, the computer device further includes a charger electrically connected to the I/O chip. The I/O chip wakes up the smart battery through the charger when the current capacity of the smart battery is 0.

In an embodiment, the computer device further includes an AC adapter electrically connected to the charger. The charger obtains power from the AC adapter and charging the smart battery when the current capacity of the smart battery is 0.

In an embodiment, the second byte includes a temperature determining bit configured to record the operating temperature of the smart battery. The CPU performs the frequency down-conversion when the CPU reads the temperature determining bit and the operating temperature of the smart battery is higher than a first temperature. The CPU is shut down when the CPU reads the temperature determining bit and the operating temperature of the smart battery is higher than a second temperature, wherein the second temperature is less than the first temperature.

In an embodiment, the second byte further includes an over-current determining bit configured to record the status of the over-current of the smart battery. The CPU performs the frequency down-conversion when the CPU reads the over-current determining bit and a value of the over-current value of the smart battery is larger than a warning value.

In an embodiment, when the value of the over-current of the smart battery is larger than the warning value, the CPU determines a frequency down-conversion range according to a range of the over-current being increased of the smart battery.

In an embodiment, the smart battery transmits the status of the smart battery to the CPU through a system management bus (SMBus), the chipset and the I/O chip sequentially when the status of the smart battery is changed.

In summary, the technical solutions of the present invention have obvious advantages and beneficial effects over the prior art. With the above technical solutions, considerable advances of technology and extensive utilization in industry can be achieved. The present invention has an advantage in that adding the second path to further compare and confirm and having a further mechanism to check on.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts. In addition, the well-known components and steps are not described in the embodiments to avoid unnecessary limitations to the present invention.

So far as a computer device is concerned, especially a notebook computer device, it is called a battery mode that the power source of the computer device is from the power of a smart battery inside the computer device. The smart battery may be connected to an external power source to store the power. Moreover, if a chip of the smart battery is met a specification of the smart battery system (SBS), a memory in the chip may save much information (e.g., a type, a factory owner, a model) and many statuses (e.g., a current capacity, an operating temperature, an over-current, a battery life) about the smart battery by the form of the bytes that have the relative byte addresses corresponding to the information and the statuses. In the memory, these bytes are saved the information and the statuses about the smart battery originally. Besides, some bytes are never used. A system manager may use the some bytes never used to expand the monitor function of the smart battery.

When the computer device is operated on the battery mode, a system terminal (e.g., an input/output chip) of the computer device will warn early for an operating temperature and an over-current of the smart battery and notify the CPU to perform the protective action (e.g., to perform a frequency down-conversion, to shut down). For example, the range of the operating temperature for the smart battery working normally is 0 to 55° C. When the operating temperature detected by the smart battery reaches to 50° C. but not to 55° C., the input/output chip will notify the CPU to perform the frequency down-conversion so as to avoid the damage. When the operating temperature detected by the smart battery reaches to 60° C., the input/output chip will notify the CPU to perform the frequency down-conversion again or shut down. Adding a second path to transmit the status of the smart battery to the CPU so as to promote the correctness of the status of the smart battery determined by the system terminal.

Figure 1:
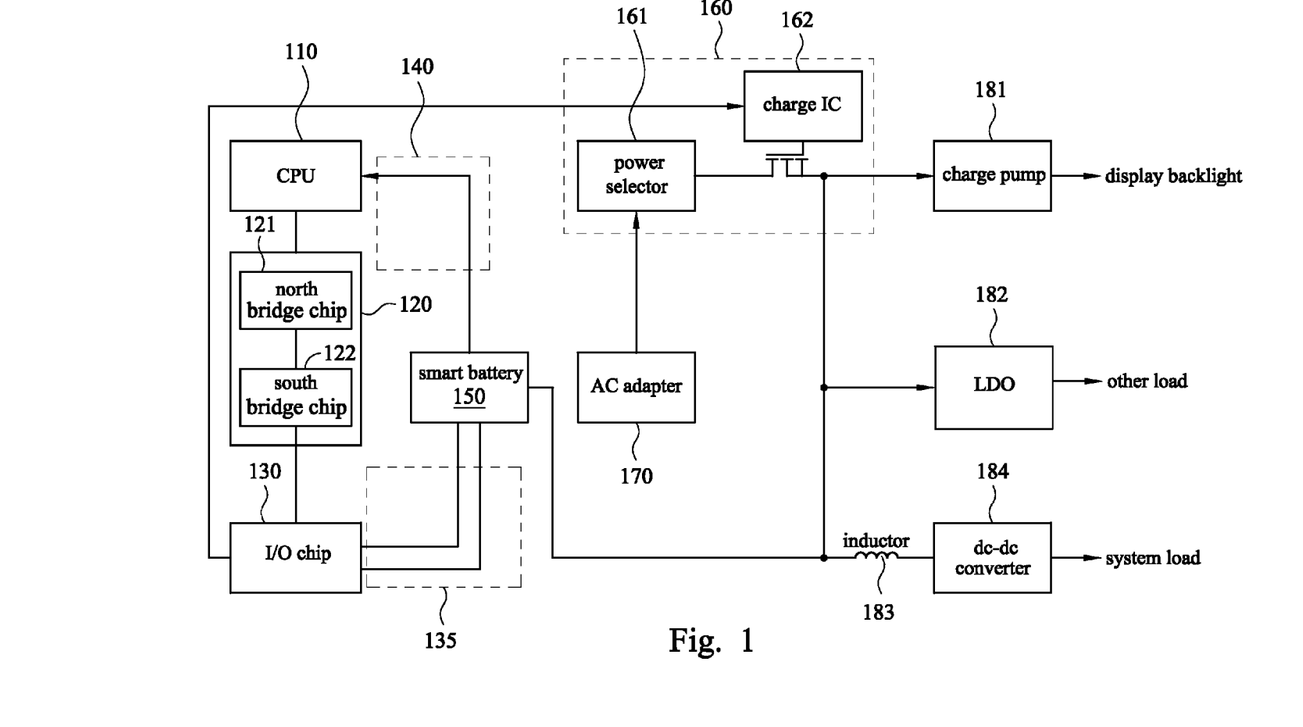
FIG. 1 is a schematic diagram of a computer device according to an embodiment of the present invention.

FIG. 1 is a schematic diagram of the computer device according to an embodiment of the present invention. As shown in FIG. 1, in an embodiment, the computer device includes a central processing unit (CPU) 110, a chipset 120, an input/output (I/O) chip 130, a general purpose I/O (GPIO) interface 140, and a smart battery 150. In structure, the chipset 120 is electrically connected to the CPU 110. The I/O chip 130 is electrically connected to the chipset 120. The GPIO interface 140 is electrically connected to the CPU 110. The smart battery 150 is electrically connected to the GPIO interface 140 and the I/O chip 130. In an embodiment, the chipset 120 further includes a north bridge chip 121 and a south bridge chip 122. The north bridge chip 121 is electrically connected to the CPU 110. The south bridge chip 122 is electrically connected to the north bridge chip 121 and the I/O chip 130.

The GPIO interface 140 that is connected to the smart battery 150 and the CPU 110 is the second path as mentioned above. In practice, when the status of the smart battery 150 is changed, the CPU 110 reads information of two bytes saved in the chip of the smart battery 150 through the GPIO interface 140 and determines a relative processing according to the information of the two bytes. The two bytes are two continuous and unused bytes in the memory of the smart battery 150.

In an embodiment, when the status of the smart battery 150 is changed, the CPU 110 reads the information about the changed status of the smart battery 150 through the second path. Furthermore at the same time, the smart battery 150 transmits the status of the smart battery 150 to the CPU 110 through a first path that includes a system management bus (SMBus) 135, the I/O chip 130 and the chipset 120 sequentially. In conclusion, when the status of the smart battery 150 is changed, the smart battery 150 notifies the CPU 110 through two paths totally. A transmission speed of the second path is faster than the first path because the second path only passes through the GPIO interface 140. The CPU 110 itself may perform the relative processing (e.g., to perform the frequency down-conversion, to shut down) immediately after the CPU 110 receives the notification through the second path.

When the status of the smart battery 150 is changed so that the smart battery 150 notifies the CPU 110 no matter through the first path or the second path, the CPU 110 transmits the instruction (e.g., a warning instruction, a sleeping instruction) through the chipset 120 and the I/O chip 130 sequentially once the CPU 110 must transmit the instruction to the other elements inside the computer device. For example, the warning instruction is to notify a display card to display a warning window on a monitor, and the sleeping instruction is to notify an operating system to save the current processing documents and programs in a hard disk. Because the CPU 110 may read the status of the smart battery 150 through both the first path and the second path, the instruction of the relative processing will be transmitted to the I/O chip 130 in sequence. The I/O chip 130 is added a determined procedure that take a first instruction received mainly to avoid executing same instructions if the CPU 110 transmits the same instructions due to the same status of the smart battery 150.

In an embodiment, the information of the bytes includes a first byte and a second byte. The first byte and the second byte are two continuous and unused bytes in the memory of the chip of the smart battery 150. The first byte is a high byte that includes bit 8 to bit 15, and the second byte is a low byte that includes bit 0 to bit 7. The first byte records a proportion of current capacity to full charge capacity and a proportion of the full charge capacity to rated capacity of the smart battery 150. To take an example, the rated capacity of the smart battery 150 is 3000 mAh, and the full charge capacity is less and less with the longer using time or the more charging time. So, the full charge capacity is less than 3000 mAh even though the smart battery 150 is full charge. If the full charge capacity is 1500 mAh, the full charge capacity is 50% of the rated capacity. To take another example, the full charge capacity of the smart battery 150 is 3000 mAh. If the current capacity is 300 mAh after the smart battery 150 is used some time later, the current capacity is 10% of the full charge capacity. The second byte records a status of an operating temperature (e.g., 55° C.) and a status of an over-current (e.g., 2.5 A) of the smart battery 150.

In an embodiment, the first byte includes two full charge capacity bits configured to record the proportion of the full charge capacity to the rated capacity of the smart battery 150. Table 1 is a comparing table of the two full charge capacity bits included in the first byte, the status of the smart battery 150, and the relative processing of the CPU 110 of the computer device according to an embodiment of the present invention.

TABLE 1

| The first byte (high bit) bit | | | | | | | | The proportion of full charge capacity to rated capacity of the smart battery 150 | The relative processing of the CPU 110 |
|---|---|---|---|---|---|---|---|---|---|
| 15 | 14 | 13 | 12 | 11 | 10 | 9 | 8 | | |
| 1 | 0 | 0 | 0 | X | 0 | 0 | 1 | <50% | Frequency down-conversion 20% and warning |
| 1 | 0 | 0 | 0 | X | 0 | 1 | 1 | <40% | Frequency down-conversion 30% and warning |
| 1 | 0 | 0 | 0 | X | 1 | 0 | 1 | <30% | Frequency down-conversion 40% and warning | where '1' indicates a '1' signal, '0' indicates a '0' signal, and 'X' indicates a <don't care>.

For example, the two full charge capacity bits are bit 15 and bit 8. If the rated capacity of the smart battery 150 is 3000 mAh, both bit 15 and bit 8 of the full charge capacity bits are '1' when the full charge capacity of the smart battery 150 is less than a warning proportion (e.g., 50%) of the rated capacity 3000 mAh, i.e., the full charge capacity of the smart battery 150 is less than 1500 mAh. When the CPU 110 reads the full charge capacity bits and the full charge capacity of the smart battery 150 is lower than the warning proportion 50% of the rated capacity, the CPU 110 sends the warning instruction through the chipset 120 and the I/O chip 130 sequentially and determines a frequency down-conversion range according to the proportion of the full charge capacity to the rated capacity of the smart battery 150

As shown in Table 1, the CPU 110 sends the warning instruction and performs the frequency down-conversion 20% when the full charge capacity of the smart battery 150 is less than 50% of the rated capacity. The CPU 110 sends the warning instruction and performs the frequency down-conversion 30% when the full charge capacity of the smart battery 150 is less than 40% of the rated capacity. The CPU 110 sends the warning instruction and performs the frequency down-conversion 40% when the full charge capacity of the smart battery 150 is less than 30% of the rated capacity.

Figure 2:
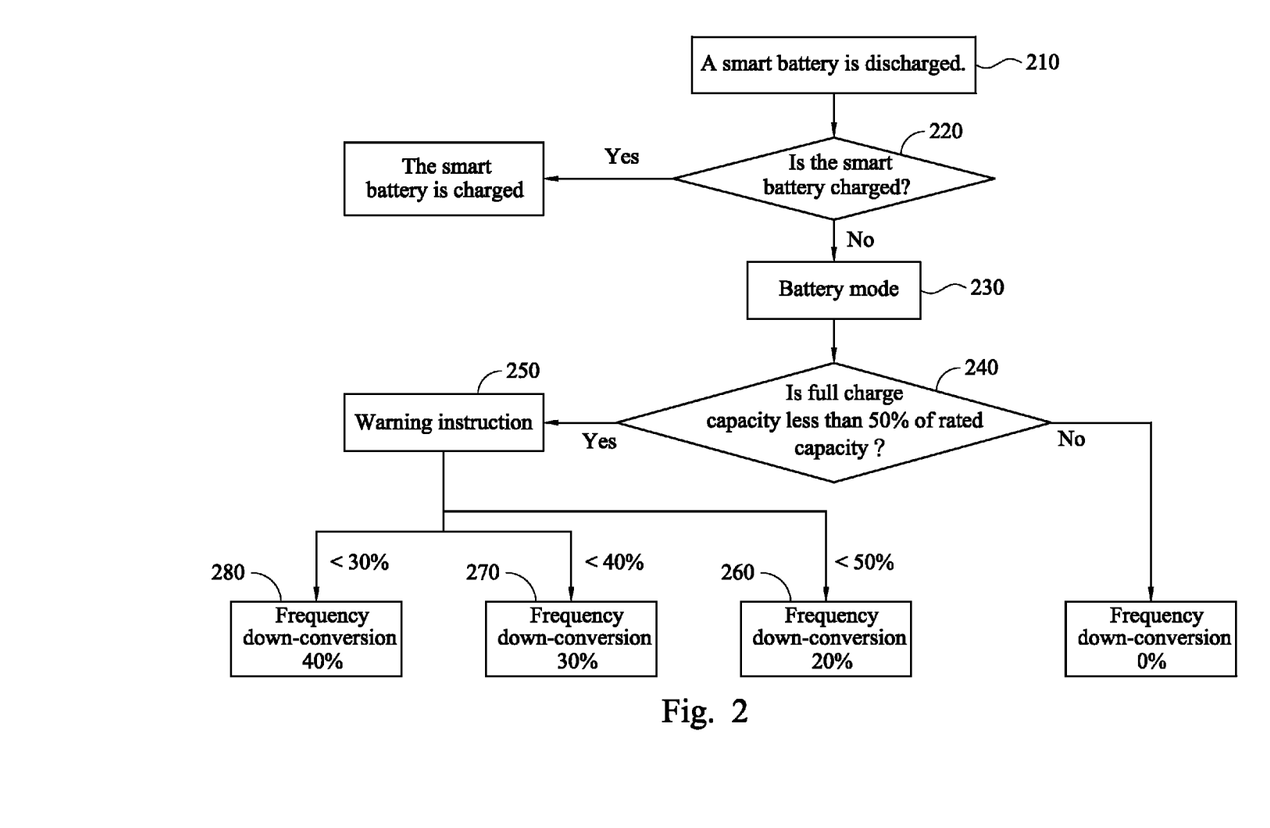
FIG. 2 is a flow chart of the computer device execution according to an embodiment of the present invention.

FIG. 2 is the flow chart of the computer device execution according to an embodiment of the present invention, and it is configured to further explain Table 1 as mentioned above. As shown in FIG. 2, the flow that the CPU 110 performs the relative processing according to the full charge capacity of the smart battery 150 comprises steps 210-280 (it should be understood that the order of the steps mentioned in the present embodiment may be changed based on actual requirement unless otherwise specified, or the steps may even be performed simultaneously or part of the steps may even be performed simultaneously).

As shown in FIG. 1, FIG. 2, and Table 1, in step 210, the smart battery 150 is discharged. In step 220, the smart battery 150 is determined whether it is or not charged. If the smart battery 150 is charged, the power source of the computer device is the external power source. If the smart battery 150 is not charged, in step 230, the computer device is operated on the battery mode. The smart battery 150 will be started to record its status, and the CPU 110 will be notified the status of the smart battery 150 through the first path and the second path as mentioned previously.

In the step 240, the smart battery 150 determines the proportion of the full charge capacity to the rated capacity and records the two full charge capacity bits of the first byte, i.e., bit 15 and bit 8. When the proportion of the full charge capacity to the rated capacity is not less than 50%, the CPU 110 may not perform the frequency down-conversion. Once the proportion of the full charge capacity to the rated capacity is less than 50%, both bit 15 and bit 8 are '1', and the different proportions are differentiated by bit 9 and bit 10. In step 250, the CPU 110 will send the warning instruction first. In step 260, the CPU 110 will perform the frequency down-conversion 20% when the proportion of the full charge capacity to the rated capacity is less than 50% but more than 40%. In step 270, the CPU 110 will perform the frequency down-conversion 30% when the proportion of the full charge capacity to the rated capacity is less than 40% but more than 30%. In step 280, the CPU 110 will perform the frequency down-conversion 40% when the proportion of the full charge capacity to the rated capacity is less than 30%. Therefore, the CPU 110 is reduced the operating frequency to load the demand for working when the power is low.

In an embodiment, the first byte further includes a current capacity bit configured to record the proportion of the current capacity and the full charge capacity of the smart battery 150. Table 2 is a comparing table of the current capacity bit included in the first byte, the status of the smart battery 150, and the relative processing of the CPU 110 of the computer device according to an embodiment of the present invention.

TABLE 2

| The first byte (high bit) bit | | | | | | | | The proportion of the current capacity and the full charge capacity of the smart battery 150 | The relative processing of the CPU 110 |
|---|---|---|---|---|---|---|---|---|---|
| 15 | 14 | 13 | 12 | 11 | 10 | 9 | 8 | | |
| X | X | X | X | 1 | X | 0 | 0 | 10% | Warning |
| X | X | X | X | 1 | X | 1 | 0 | 7% | Warning and compensating |
| X | X | X | X | 1 | X | 0 | 1 | 4% | Warning and sleeping | where '1' indicates a '1' signal, '0' indicates a '0' signal, and 'X' indicates a <don't care>.

For example, the current capacity bit is bit 11. If the full charge capacity of the smart battery 150 is 3000 mAh, bit 11 of the current capacity bit is '1', and the CPU 110 sends the warning instruction through the chipset 120 and the I/O chip 130 sequentially when the CPU 110 reads the current capacity bit and the current capacity of the smart battery 150 is a first proportion (e.g., 10% in Table 2) of the full charge capacity. For example, the warning is appeared on a window or a speaker on the computer device. The CPU 110 sends the warning instruction and a compensation instruction through the chipset 120 and the I/O chip 130 sequentially when the CPU 110 reads the current capacity bit and the current capacity of the smart battery 150 is a second proportion (e.g., 7% in Table 2) of the full charge capacity. For example, the CPU 11 calibrates the power of the smart battery 150 through the BIOS of the computer device. The CPU 110 sends the warning instruction and a sleeping instruction through the chipset 120 and the I/O chip 130 sequentially when the CPU 110 reads the current capacity bit and the current capacity of the smart battery 150 is a third proportion (e.g., 4% in Table 2) of the full charge capacity. The second proportion is less than the first proportion, and the third proportion is less than the second proportion.

In an embodiment, the second byte includes a temperature determining bit configured to record the operating temperature of the smart battery 150. Table 3 is a comparing table of the temperature determining bit included in the second byte, the status of the smart battery 150, and the relative processing of the CPU 110 of the computer device according to an embodiment of the present invention.

TABLE 3

| The second byte (low bit) bit | | | | | | | | The status of the operating temperature of the smart battery 150 | The relative processing of the CPU 110 |
|---|---|---|---|---|---|---|---|---|---|
| 7 | 6 | 5 | 4 | 3 | 2 | 1 | 0 | | |
| 1 | 0 | 0 | 0 | X | X | X | X | >50° C. | Frequency down-conversion |
| 1 | 0 | 0 | 1 | X | X | X | X | 50 to 60° C. | Frequency down-conversion |
| 1 | 0 | 1 | 0 | X | X | X | X | >60° C. | Shut down | where '1' indicates a '1' signal, '0' indicates a '0' signal, and 'X' indicates a <don't care>.

For example, the temperature determining bit is bit 7. As mentioned previously, the range of the operating temperature for the smart battery 150 working normally is 0 to 55° C. When the operating temperature of the smart battery 150 reaches to 50° C. but not to 55° C., bit 7 of the temperature determining bit is '1', and the CPU 110 will perform the relative processing to avoid the damage. The CPU 110 performs the frequency down-conversion about 10% when the CPU 110 reads the temperature determining bit and the operating temperature of the smart battery 150 is higher than a first temperature (e.g., 50° C. in Table 3). The CPU 110 performs a frequency down-conversion about 10% again when the CPU 110 reads the temperature determining bit and the operating temperature of the smart battery 150 is higher than the first temperature but lower than a second temperature (e.g., 60° C. in Table 3). The CPU 110 is shut down when the CPU 110 reads the temperature determining bit and the operating temperature of the smart battery is higher than the second temperature. The second temperature is less than the first temperature.

In an embodiment, the second byte further includes an over-current determining bit configured to record the status of the over-current of the smart battery 150. Table 4 is a comparing table of the over-current determining bit included in the second byte, the status of the smart battery 150, and the relative processing of the CPU 110 of the computer device according to an embodiment of the present invention.

TABLE 4

| The second byte (low bit) bit | | | | | | | | The status of the over-current of the smart battery 150 | The relative processing of the CPU 110 |
|---|---|---|---|---|---|---|---|---|---|
| 7 | 6 | 5 | 4 | 3 | 2 | 1 | 0 | | |
| X | 1 | 0 | 0 | X | X | X | X | >2.5 A | Frequency down-conversion |
| X | 1 | 0 | 1 | X | X | X | X | >3.0 A | Frequency down-conversion |
| X | 1 | 1 | 0 | X | X | X | X | >3.5 A | Frequency down-conversion | where '1' indicates a '1' signal, '0' indicates a '0' signal, and 'X' indicates a <don't care>.

For example, the over-current determining bit is bit 6. When a value of the over-current of the smart battery 150 is larger than a warning value (e.g., 2.5 A), bit 6 of the over-current determining bit is T. The CPU 110 performs the frequency down-conversion when the CPU 110 reads the over-current determining bit and the value of the over-current of the smart battery 150 is larger than the warning value.

In an embodiment, the CPU 110 determines the frequency down-conversion range according to a range of the over-current being increased of the smart battery 150 when the value of the over-current of the smart battery 150 is larger than the warning value. For example, the CPU 110 performs the frequency down-conversion about 10% when the CPU 110 reads the over-current determining bit and the value of the over-current of the smart battery 150 is larger than 2.5 A. The CPU 110 performs the frequency down-conversion about 10% again when the CPU 110 reads the over-current determining bit and the value of the over-current of the smart battery 150 is larger than 3.0 A. The CPU 110 performs the frequency down-conversion about 10% again when the CPU 110 reads the over-current determining bit and the value of the over-current of the smart battery 150 is larger than 3.5 A.

Figure 3:
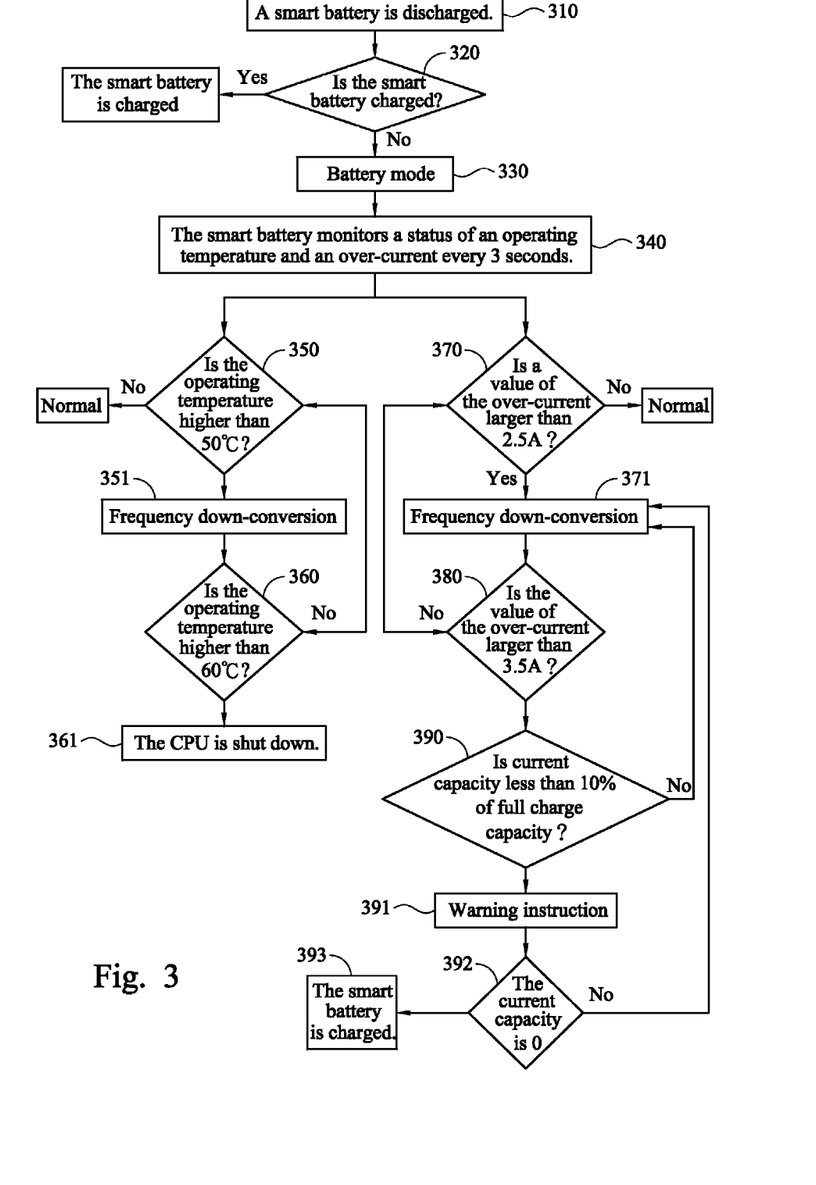
FIG. 3 is another flow chart of the computer device execution according to an embodiment of the present invention.

FIG. 3 is another flow chart of the computer device execution according to an embodiment of the present invention, and it is configured to further explain Table 3 and Table 4 as mentioned above. As shown in FIG. 3, the flow that the CPU 110 performs the relative processing according to the operating temperature and the over-current of the smart battery 150 comprises steps 310-393 (it should be understood that the order of the steps mentioned in the present embodiment may be changed based on actual requirement unless otherwise specified, or the steps may even be performed simultaneously or part of the steps may even be performed simultaneously).

As shown in FIG. 1, FIG. 3, Table 3, and Table 4, step 310-330 are the same as step 210-230 in FIG. 2. These steps are configured to determine whether the smart battery 150 is or not charged, so further elaboration is not provided. In step 340, the smart battery 150 monitors the status of the operating temperature and the over-current of the smart battery 150 every 3 seconds. In step 350, the smart battery 150 determines the operating temperature and records in the temperature determining bit of the second byte, i.e., bit 7. When the operating temperature is not higher than 50° C., the status of the smart battery 150 is normal. When the operating temperature is higher than 50° C., bit 7 is '1'. In step 351, the CPU 110 will perform the frequency down-conversion, and the operating temperature grades of the smart battery 150 are differentiated by bit 4 and bit 5. In step 360, the smart battery 150 continues determining if the operating temperature is higher than 60° C. When the operating temperature is higher than 60° C., in step 361, the CPU 110 will be shut down.

In step 370, the smart battery 150 determines the status of the over-current and records in the over-current determining bit of the second byte, i.e., bit 6. When the value of the over-current is not larger than 2.5 A, the status of the smart battery 150 is normal. When the value of the over-current is larger than 2.5 A, bit 6 is '1'. In step 371, the CPU 110 will perform the frequency down-conversion, and the over-current grades of the smart battery 150 are differentiated by bit 4 and bit 5.

In step 380, the smart battery 150 continues determining if the value of the over-current is larger than 3.5 A. When the value of the over-current is larger than 3.5 A, backing to step 370, the smart battery 150 continues determining if the value of the over-current is larger than 2.5 A. When the value of the over-current is larger than 3.5 A, in step 390, the proportion of the current capacity to the full charge capacity of the smart battery 150 is determined if it is less than 10%. When the proportion is more than 10%, the CPU 110 will perform the frequency down-conversion only. When the proportion is less than 10%, in step 391, the CPU 110 will transmit the warning instruction and determine if the proportion of the current capacity to the full charge capacity is 0. When the current capacity of the smart battery 150 is not 0, the CPU 110 will perform the frequency down-conversion only. When the proportion of the current capacity to the full charge capacity of the smart battery 150 is 0, in step 393, a charger 160 charges the smart battery 150 and wakes up the smart battery 150 after the AC adapter 170 obtains the power.

In an embodiment, the computer device further includes the charger 160 electrically connected to the I/O chip 130. The charger 160 includes a power selector 161 and a charge IC 162. The power selector 161 is configured to check on the external power into the computer device. When the power selector 161 is turned on, the external power will enter to the charge IC 162 so that the charge IC 162 charges the smart battery 150 and provides the power demand for the other devices in the computer device. For example, a charge pump 181 will provide the power to the display for the backlight; a LDO 182 will provide the power to the other loads (e.g., audio, RF, sensors); and a dc-dc converter 184 obtains the power through an inductor 183 and provides the power to system loads (e.g., fans, memories).

Table 5 is a comparing table of the current capacity bit included in the first byte, the status of the smart battery 150, and the relative processing of the CPU 110 of the computer device according to an embodiment of the present invention.

TABLE 5

| The first byte (high bit) bit | | | | | | | | The status of the smart battery 150 | The relative processing of the computer device |
|---|---|---|---|---|---|---|---|---|---|
| 15 | 14 | 13 | 12 | 11 | 10 | 9 | 8 | | |
| X | X | X | X | 1 | 1 | 1 | 1 | The proportion of the current capacity to the full charge capacity is 0 or the current capacity is lower than 5 V | The I/O chip 130 wakes up the smart battery 150 through the charger 160 | where '1' indicates a '1' signal, '0' indicates a '0' signal, and 'X' indicates a <don't care>.

When the proportion of the current capacity to the full charge capacity of the smart battery 150 is 0%, i.e., the power is 0, or the current capacity is lower than a starting voltage (e.g., 5V) of the smart battery 150, not only bit 11 of the current capacity bit but also bit 10 are '1', and the I/O chip 130 wakes up the smart battery 150 through the charger 160.

In an embodiment, the computer device further includes the AC adapter 170, and the AC adapter 170 is electrically connected to the charger 160. In practice, the AC adapter 170 may be connected to an AC power source. When the current capacity of the smart battery 150 does not reach to the full charge capacity, the power selector 161 will turn on to make the charger 160 charge the smart battery 150. When the power of the smart battery 150 is 0, a charger 160 will obtain the power from the AC adapter 170 and charge the smart battery 150.

Figure 4:
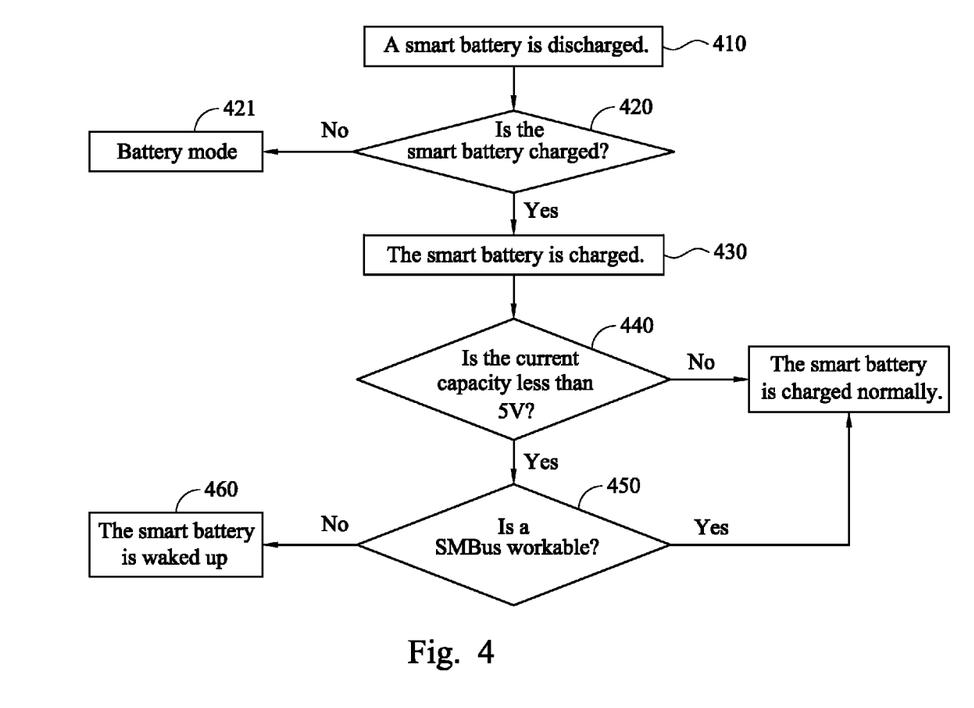
FIG. 4 is a further flow chart of the computer device execution according to another embodiment of the present invention.

A flow chart is configured to further explain Table 5 as mentioned above. FIG. 4 is a further flow chart of the computer device execution according to another embodiment of the present invention. As shown in FIG. 4, the flow that the CPU 110 performs the relative processing according to the current capacity of the smart battery 150 comprises steps 410-460 (it should be understood that the order of the steps mentioned in the present embodiment may be changed based on actual requirement unless otherwise specified, or the steps may even be performed simultaneously or part of the steps may even be performed simultaneously).

As shown in FIG. 1, FIG. 4, and Table 5, in step 410, the smart battery 150 is discharged. In step 420, the smart battery 150 is determined whether it is or not charged. If the smart battery 150 is not charged, in step 421, the computer device is on the battery mode. If the smart battery 150 is charged, in step 430, the smart battery 150 turns on the charging process. In step 440, the current capacity of the smart battery 150 is determined if it is lower than 5V. If the current capacity of the smart battery 150 is not lower than 5V, the smart battery 150 is still workable. At the time, the charger 160 may charge the smart battery 150 normally. If the current capacity of the smart battery 150 is lower than 5V (e.g., the computer device does not be turned on for a long time so that the power of the smart battery 150 had been lost), the smart battery 150 is not workable. At the time, in step 450, the SMBus 135 is determined if it is workable. If the SMBus 135 is workable, the smart battery 150 may communicate with the system, and the charger 160 may charge the smart battery 150 normally. But if the SMBus 135 is not workable, in step 460, the smart battery 150 must be waked up. In an embodiment, after the AC adapter 170 obtains the power, the charge IC 162 of the charger 160 continues providing 6V/256 mA power 30 seconds to the smart battery 150 every 1 minute and repeats 5 times, and the smart battery 150 will be waked up.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A computer device, comprising:
   a central processing unit (CPU);
   a chipset electrically connected to the CPU;

an input/output (I/O) chip electrically connected to the chipset;

a general purpose I/O (GPIO) interface electrically connected to the CPU; and a smart battery electrically connected to the GPIO interface and the I/O chip, wherein the CPU reads information of two bytes saved in the smart battery through the GPIO interface and determines a relative processing according to the information of the two bytes when a status of the smart battery is changed, wherein the information of the two bytes comprises:

a first byte recording a proportion of current capacity to full charge capacity and a proportion of the full charge capacity to rated capacity of the smart battery; and a second byte recording a status of an operating temperature and a status of an over-current of the smart battery, wherein the first byte and the second byte are continuous, and the first byte is a high byte and the second byte is a low byte.

2. The computer device of claim 1, wherein the first byte comprises two full charge capacity bits configured to record the proportion of the full charge capacity to the rated capacity of the smart battery; and when the CPU reads the full charge capacity bits and the full charge capacity of the smart battery is lower than a warning proportion of the rated electrical quantity, the CPU sends a warning instruction through the chipset and the input/output chip sequentially and determines a frequency down-conversion range according to the proportion of the full charge capacity to the rated capacity of the smart battery.

3. The computer device of claim 1, wherein the first byte further comprises a current capacity bit configured to record the proportion of the current capacity to the full charge capacity of the smart battery;

the CPU sends a warning instruction through the chipset and the I/O chip sequentially when the CPU reads the current capacity bit and the current capacity of the smart battery is a first proportion of the full charge capacity;

the CPU sends the warning instruction and a compensation instruction through the chipset and the I/O chip sequentially when the CPU reads the current capacity bit and the current capacity of the smart battery is a second proportion of the full charge capacity, wherein the second proportion is less than the first proportion; and the CPU sends the warning instruction and a sleeping instruction through the chipset and the I/O chip sequentially when the CPU reads the current capacity bit and the current capacity of the smart battery is a third proportion of the full charge capacity, wherein the third proportion is less than the second proportion.

4. The computer device of claim 3, further comprising:

a charger electrically connected to the I/O chip; and the I/O chip waking up the smart battery through the charger when the current capacity of the smart battery is 0.

5. The computer device of claim 4, further comprising:

an AC adapter electrically connected to the charger; and the charger obtaining power from the AC adapter and charging the smart battery when the current capacity of the smart battery is 0.

6. The computer device of claim 1, wherein the second byte comprises a temperature determining bit configured to record the status of the operating temperature of the smart battery;

the CPU performs a frequency down-conversion when the CPU reads the temperature determining bit and the operating temperature of the smart battery is higher than a first temperature; and the CPU is shut down when the CPU reads the temperature determining bit and the operating temperature of the smart battery is higher than a second temperature, wherein the second temperature is less than the first temperature.

7. The computer device of claim 1, wherein the second byte further comprises an over-current determining bit configured to record the status of the over-current of the smart battery; and the CPU performs a frequency down-conversion when the CPU reads the over-current determining bit and a value of the over-current of the smart battery is larger than a warning value.

8. The computer device of claim 7, wherein when the value of the over-current of the smart battery is larger than the warning value, the CPU determines a frequency down-conversion range according to a range of the over-current being increased from the warning value of the smart battery.

9. The computer device of claim 1, wherein the smart battery transmits the status of the smart battery to the CPU through a system management bus (SMBus), the chipset and the I/O chip sequentially when the status of the smart battery is changed.

* * * * *